United States Patent
Lamberton et al.

(10) Patent No.: US 9,736,676 B2
(45) Date of Patent: Aug. 15, 2017

(54) METHOD OF CONTROLLING ACCESS TO A CELLULAR NETWORK

(71) Applicant: BUZZINBEES, Seyssinet Pariset (FR)

(72) Inventors: Marc Lamberton, Antibes (FR);
Michel Anslot, Mougins (FR); Gilles Coppe, Valbonne (FR); Philippe Bouckaert, Biot (FR)

(73) Assignee: BUZZINBEES, Seyssinet Pariset (FR)

( * ) Notice: Subject to any disclaimer, the term of this patent is extended or adjusted under 35 U.S.C. 154(b) by 0 days.

(21) Appl. No.: 14/364,990

(22) PCT Filed: Dec. 12, 2012

(86) PCT No.: PCT/EP2012/075280
§ 371 (c)(1),
(2) Date: Jun. 12, 2014

(87) PCT Pub. No.: WO2013/087718
PCT Pub. Date: Jun. 20, 2013

(65) Prior Publication Data
US 2014/0335831 A1   Nov. 13, 2014

(30) Foreign Application Priority Data

Dec. 12, 2011   (FR) ..................... 11 61491

(51) Int. Cl.
*H04M 3/16* (2006.01)
*H04W 8/18* (2009.01)
(Continued)

(52) U.S. Cl.
CPC .............. *H04W 8/18* (2013.01); *H04W 8/24* (2013.01); *H04W 12/08* (2013.01); *H04W 12/12* (2013.01);
(Continued)

(58) Field of Classification Search
CPC ..... H04W 12/10; H04W 12/02; H04W 12/08; H04W 12/12
See application file for complete search history.

(56) References Cited

U.S. PATENT DOCUMENTS 6,978,156 B1   12/2005   Papadopoulos et al.
8,260,917 B1 *  9/2012   Manikowski et al. ........ 709/225
(Continued)

FOREIGN PATENT DOCUMENTS

EP   0 71 1090   5/1996
EP   1296529   3/2003
(Continued)

OTHER PUBLICATIONS

European Patent Office International Search Report and Written Opinion for PCT/EP2012/075280 dated May 29, 2013, Applicant, Buzzinbees (10 pages).
(Continued)

*Primary Examiner* — Khalid Shaheed
*Assistant Examiner* — K Wilford
(74) *Attorney, Agent, or Firm* — McCracken & Gillen LLC

(57) ABSTRACT

A method of controlling access to a cellular communication network, for a terminal (MT) identified by a terminal identifier (IMEI) with a subscription identified by a subscription identifier (IMSI), characterized in that it comprises the following steps:
  creation in a database (DB), of at least one record comprising at least one subscription identifier with at least one terminal identifier,
  checking that said terminal (MT) together with said subscription are indeed authorized to use the cellular communication network, by verifying the presence in the database (DB) of at least one record comprising the
(Continued)

Figure 1:
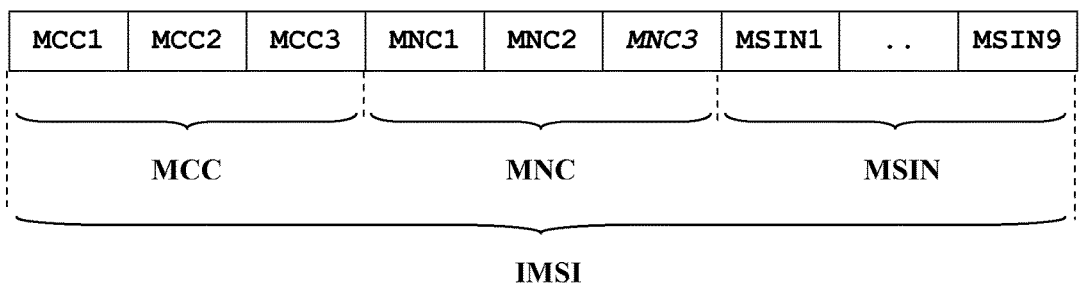

subscription identifier (IMSI) of said subscription associated with the terminal identifier (IMIE) said verification being performed at the time of each attempt at connection of said terminal (MT) or of said subscription, authorization of access or refusal of access of said terminal (MT) to said network according to the result of the verification step.

The invention also comprises a system and a computer program product to implement the method.

18 Claims, 2 Drawing Sheets

(51) Int. Cl.
| | |
|---|---|
| H04W 8/24 | (2009.01) |
| H04W 12/12 | (2009.01) |
| H04W 12/08 | (2009.01) |
| H04W 12/02 | (2009.01) |
| H04W 8/04 | (2009.01) |
| H04W 8/20 | (2009.01) |
| H04L 29/06 | (2006.01) |

(52) U.S. Cl.
CPC .......... *H04L 63/0876* (2013.01); *H04W 8/04* (2013.01); *H04W 8/205* (2013.01); *H04W 12/02* (2013.01)

(56) References Cited

U.S. PATENT DOCUMENTS

| | | | |
|---|---|---|---|
| 2003/0129991 | A1 | 7/2003 | Allison et al. |
| 2005/0152275 | A1 | 7/2005 | Laurila et al. |
| 2007/0293216 | A1 | 12/2007 | Jiang |
| 2008/0102866 | A1* | 5/2008 | Fiorillo et al. ................ 455/466 |
| 2009/0325558 | A1 | 12/2009 | Pridmore et al. |
| 2010/0094710 | A1* | 4/2010 | Ramakrishna ......... G06Q 30/02 705/14.64 |
| 2011/0199905 | A1 | 8/2011 | Pinheiro et al. |
| 2011/0292923 | A1* | 12/2011 | Noldus .......................... 370/338 |
| 2012/0164975 | A1* | 6/2012 | Dodeja et al. ................ 455/410 |
| 2013/0005334 | A1* | 1/2013 | Liang ..................... H04M 3/38 455/432.3 |

FOREIGN PATENT DOCUMENTS

| | | |
|---|---|---|
| EP | 2 385 734 | 5/2010 |
| EP | 2 192 807 | 6/2010 |
| EP | 2 265 067 | 12/2010 |
| GB | 2 327 570 | 1/1999 |
| GB | 2327570 A * | 1/1999 |
| WO | WO 99/63774 | 5/1999 |

OTHER PUBLICATIONS

"Dynamic SIM Allocation™", A new way to activate prepaid SIM cards, Evolving Systems®, (2 pages).

European Patent Office International Search Report and Written Opinion for PCT/EP2012/075282 dated Apr. 3, 2013, Applicant, Buzzinbees, (11 pages).

McTel EIR, Equipment Identity Register (2 pages).

3$^{rd}$ Generation Partnership Project; Technical Specification Group Services and System Aspects; System Improvements for Machine-Type Communications; (Release 11) 3GPP TR 23.888, V1.1.0 (Mar. 2011) Technical Report; (84 pages).

Beckmann, Chris et al., "Some Assembly Required: Supporting End-User Sensor Installation in Domestic Ubiquitous Computing Environments", Intel Research Seattle, Mar. 14, 2011, pp. 107-124 (18 pages).

International Search Report and Written Opinion for PCT/EP2013/053407 dated Jul. 24, 2013, Applicant, Buzzinbees, (13 pages).

ETSI, Digital cellular telecommunications system (Phase 2+) (GSM); Universal Mobile Telecommunications System (UMTS); Technical Report on the Gateway Location Register; (3GPP TR23.909 version 4.0.0 Release 4; vol. 3; Mar. 1, 2001 (62 pages).

* cited by examiner

METHOD OF CONTROLLING ACCESS TO A CELLULAR NETWORK

The technical field of the invention is that of cellular communication networks.

The problem addressed is as follows. A mobile terminal, in order to be able to use the services of a cellular communication network, must have a subscription to a service provider.

Such a subscription is given expression by a universal subscriber identity module (USIM) card. A USIM card is a microcircuit card of the secure memory type. Said memory contains all the identifiers enabling the cellular communication network to recognise said subscription and enabling the terminal to use the services of the cellular communication network. Such a USIM card is sometimes placed non-removably in a terminal, for example by soldering. However, usually, a USIM card is installed in a terminal by means of a card reader and is thus removable.

It may happen that a subscription is granted an advantageous tariff by a provider subject to particular use, for example with a type of terminal.

This is the case, for example, with a machine terminal used in an intermachine environment for effecting a data transmission, such as a remote measurement, between a sensing machine terminal and a data-collecting machine terminal. The intermachine communication conditions are very different from mobile telephony communication conditions. A service provider may thus offer a subscription dedicated to a machine terminal with a tariff suited to these conditions. However, it is essential that such a subscription cannot be used with a mobile telephony terminal, for which the tariff is unsuitable.

It would be advantageous to be able to reinforce such a tariff policy in complete security without risking that an advantageous tariff subscription be moved in order to be inserted and used in a terminal that is not authorised to use said tariff.

The objective of the invention is to propose a solution for preventing a subscription at the given tariff to be used in a terminal that is not authorised to use said subscription, without giving rise to constraints for the user of the terminal or for the operator.

To this end, the present invention makes provision for adding, to a cellular communication network, an access control method that allows access only after positive verification of the conditions of use. More precisely, the present invention for this purpose provides a method of controlling access to a cellular communication network, for a terminal identified by a terminal identifier with a subscription identified by a subscription identifier, comprises the following steps performed by means of at least one processor:
creation, in a database recorded in data storage means, of at least one record associating a plurality of subscription identifiers comprising at least one subscription identifier with a plurality of terminal identifiers comprising at least one terminal identifier,
verification that said terminal together with said subscription are indeed authorised to use the cellular communication network, by verification of the presence in the database of at least one record comprising the subscription identifier of said subscription associated with the terminal identifier of said terminal, said verification being performed at each connection attempt of said terminal or said subscription to the cellular communication network,
authorisation of access or refusal of access from the terminal to the subscription according to the result of the verification step.

Thus, during an attempt at connection, if in the database the identifier of the terminal is not associated with the subscription identifier then access to the network is refused. In the contrary case access is authorised.

According to another embodiment, the invention relates to a method of controlling access to a cellular communication network, for a terminal identified by a terminal identifier with a subscription identified by a subscription identifier, comprising the following steps performed by means of at least one processor:
creation, in a database recorded in data storage means, of at least one record associating a plurality of subscription identifiers comprising at least one subscription identifier with a plurality of terminal identifiers comprising at least one terminal identifier, the plurality of terminal identifiers of the record being formed by one or more terminal identifiers and/or by one or more terminal identifier ranges and/or by one or more terminal identifier prefixes, each prefix being deemed to comprise all the terminal identifiers beginning with said prefix,
checking that said terminal together with said subscription are indeed authorised to use the cellular communication network, by verifying the presence in the database of at least one record comprising the subscription identifier of said subscription associated with the terminal identifier of said terminal or associated with a prefix of an identifier of said terminal,
the record also comprising a "value mode" that determines how, during the verification step, the presence of the terminal identifier of said terminal is to be verified among the terminal identifiers of the plurality of terminal identifiers of the record, the "value mode" indicating either that the terminal identifier of said terminal must be verified exactly, or that the terminal identifier of said terminal must be verified for a limited part to its prefix,
said verification being performed at the time of each attempt at connection of said terminal or of said subscription to the cellular communication network,
authorisation of access or refusal of access of said terminal to said network according to the result of the verification step.

As will be described in more detail subsequently, this embodiment makes it possible to choose how it is wished to authorise the functioning of a subscription identifier, typically an IMSI carried by SIM card, with the equipment in which this SIM card is liable to be inserted.

According to the value indicated in the record, it will be possible to choose:
to authorise the functioning of the subscription identifier only if the identifier of the terminal that wishes to access the network appears among the terminal identifiers included in the record. Thus all the figures of the identifier of the terminal that wishes to access the network must appear in one of the terminal identifiers in the record.
If the record includes only a single terminal identifier, then the SIM card will not be able to be used in equipment other than the terminal for which the terminal identifier is indicated in the record.
If the record comprises a plurality of terminal identifiers or one or more terminal identifier ranges, then the SIM card will be able to be used only in the equipment for which the terminal identifier belongs to this plurality of terminal identifiers or this/these terminal identifier ranges.

to authorise the functioning of the subscription identifier only if the terminal identifier of the terminal that wishes to access the network has a prefix that corresponds to one or more prefixes included in the record. Thus it suffices that only the figures of the prefix of the terminal identifier that wishes to access the network appear in one of the prefixes included in the record, for the terminal to be authorised to access the network.

Thus the SIM card will not be able to be used in equipment other than those for which the terminal identifier has the prefix indicated in the record.

As will appear more precisely in detail hereinafter, the invention thus offers a flexible and effective solution for preventing a SIM card being removed from an apparatus for which it is intended in order then to be used in another apparatus. Moreover, this solution can easily be configured to adapt easily to the various possible cases of use.

Optionally, the invention also comprises at least any one of the optional features and steps indicated below.

According to another feature of the invention, the step of creating a record in the database is automatically done at the time of a first attempt at connection of a terminal and of a subscription, the record thus created comprising a plurality of subscription identifiers comprising at least the subscription identifier of said subscription associated with a plurality of terminal identifiers comprising at least the terminal identifier of said terminal.

According to another feature of the invention, a plurality of subscription identifiers is defined by at least one range defined by a minimum subscription identifier and a maximum subscription identifier, and is deemed to comprise all the subscription identifiers included between said minimum subscription identifier and said maximum subscription identifier.

According to another feature of the invention, a plurality of terminal identifiers are defined by at least a terminal identifier prefix, and are deemed to comprise all the terminal identifiers beginning with said prefix.

According to another feature of the invention, a record in the database also comprises a "verification mode" taking its values from: "no verification" for which the subscription identifier of the subscription is not verified, "static verification" for which the subscription identifier of the subscription is verified in relation to the terminal identifier and the records in the database, and "dynamic verification" for which a record in the database is created/updated, the "verification mode" of said record being, after creation, changed from "dynamic verification" to another value.

According to another feature of the invention, a record in the database also comprises a "value mode" taking its values from: "IMEI" for which a terminal identifier is verified exactly, and "TAC" for which a terminal identifier is verified for a limited part to its prefix.

According to another feature of the invention, the verification and authorisation steps are implemented by intercepting control messages, necessarily passing through a module, when there is an attempt at connection of a terminal to the cellular communication network.

According to another feature of the invention, said module is a location register module.

According to another feature of the invention, said module is an equipment identity register.

According to another feature of the invention, said terminal is a sensor dedicated to a machine. It is configured to transmit over the network information that it captures. This information is typically transmitted to a server connected to said network and associated with an application.

According to another feature of the invention, the method being applied to an intermachine environment dedicated to machine terminals, the verification and authorisation steps are used by intercepting control messages, necessarily passing through a module substituted, with regard to said machine terminals, for a location register module and/or an equipment identity register module. Preferably, said module fulfils the function of location register module and equipment identity register module.

At least any one of the previous steps is executed by means of at least one data processor.

According to another aspect, the present invention relates to a computer program product comprising a non-transient medium that can be read by a computer, the product or the medium comprising instructions which, when they are implemented by at least one processor, executes at least the following steps of the method according to the invention:

verification that said terminal together with said subscription are indeed authorised to use the cellular communication network, by verifying the presence in the database of at least one record comprising the subscription identifier of said subscription associated with the terminal identifier of said terminal, said verification being done at the time of each attempt at connection of said terminal or of said subscription to the cellular communication network, authorisation of access or refusal of access of the terminal to the subscription according to the result of the verification step.

Advantageously, according to a particular embodiment, the computer program product also comprises instructions which, when they are effected by at least one processor, executes the step of creation, in a database, of at least one record associating a plurality of subscription identifiers comprising at least one subscription identifier with a plurality of terminal identifiers comprising at least one terminal identifier.

According to another aspect, the present invention relates to a system of controlling access to a cellular communication network, for a terminal identified by a terminal identifier with a subscription identified by a subscription identifier (IMSI). The system comprises:

data storage means comprising a database, the database comprising at least one record associating a plurality of subscription identifiers comprising at least one subscription identifier with a plurality of terminal identifiers comprising at least one terminal identifier, verification means configured to verify, at the time of each attempt at connection of said terminal or of said subscription to the cellular communication network, that said terminal together with said subscription are indeed authorised to use the cellular communication network, by verifying the presence in the database of at least one record comprising the subscription identifier of said subscription associated with the terminal identifier of said terminal, means arranged to authorise access or refuse access of said terminal to said network according to the result of the verification.

According to another aspect, the present invention provides a method of controlling access to a cellular communication network, for a terminal identified by a terminal identifier with a subscription identified by a subscription identifier, comprising the following steps:

creation, in a database, of at least one record associating a plurality of subscription identifiers comprising at least one subscription identifier with a plurality of terminal identifiers comprising at least one terminal identifier, verification that said terminal together with said subscription are indeed authorised to use the cellular communication network, by verification, in a database comprising at least one record associating a plurality of subscription identifiers comprising at least one subscription identifier with a plurality of terminal identifiers comprising at least one terminal identifier, of the presence in the database of at least one record comprising the subscription identifier of said subscription associated with the terminal identifier of said terminal, said verification being done at the time of each attempt at connection of said terminal or of said subscription to the cellular communication network, authorisation of access or refusal of access of the terminal to the subscription according to the result of the verification step.

The record associating a plurality of subscription identifiers with a plurality of terminal identifiers may be created at the first attempt at connection of the terminal to the network. It may also be created before the first attempt at connection of the terminal to the network.

Figure 2:
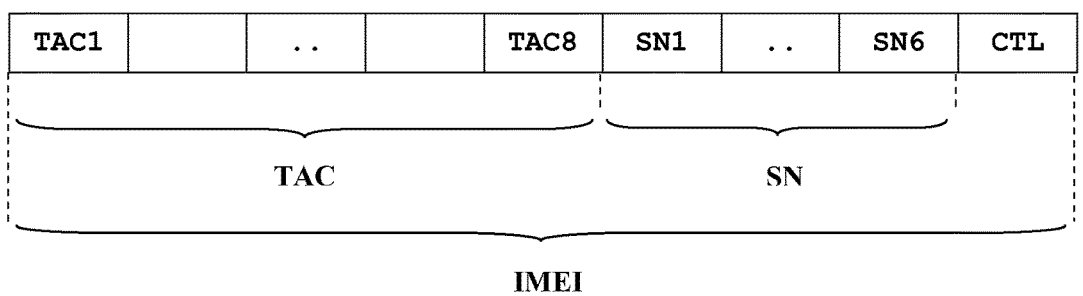
Figure 3:
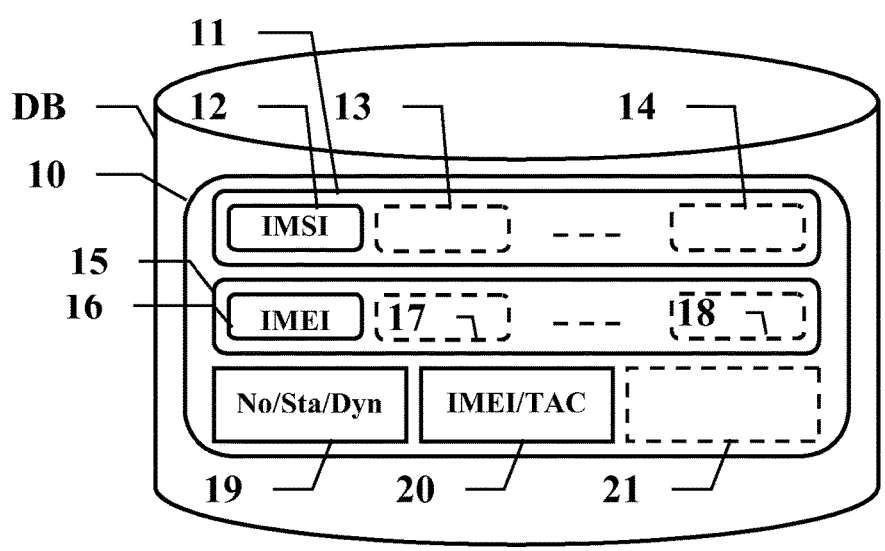
Figure 4:
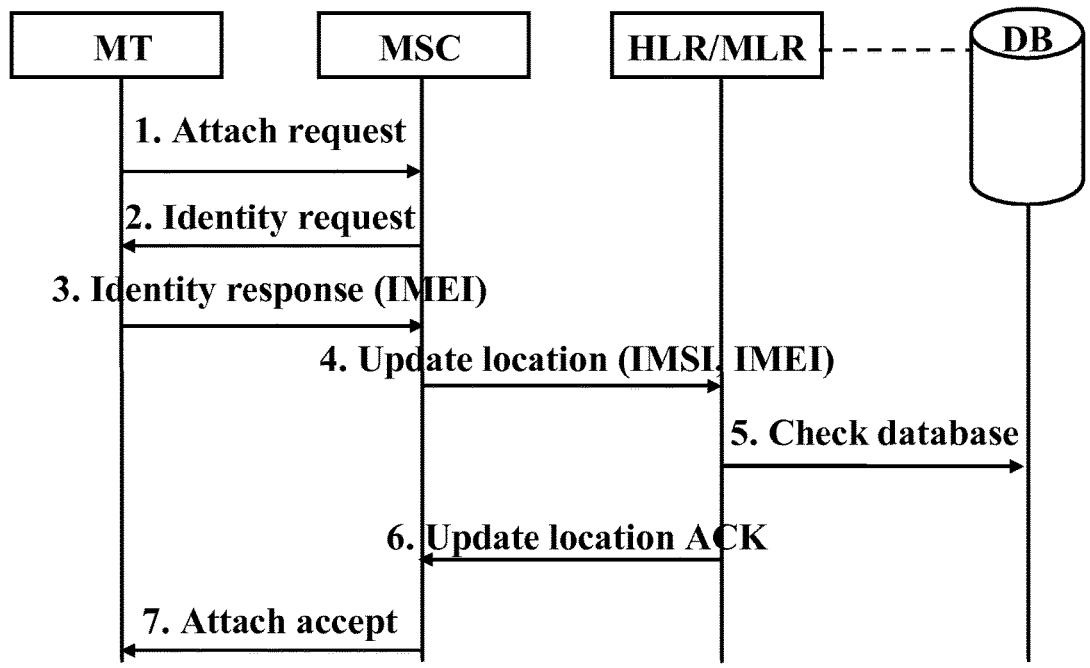
Figure 5:
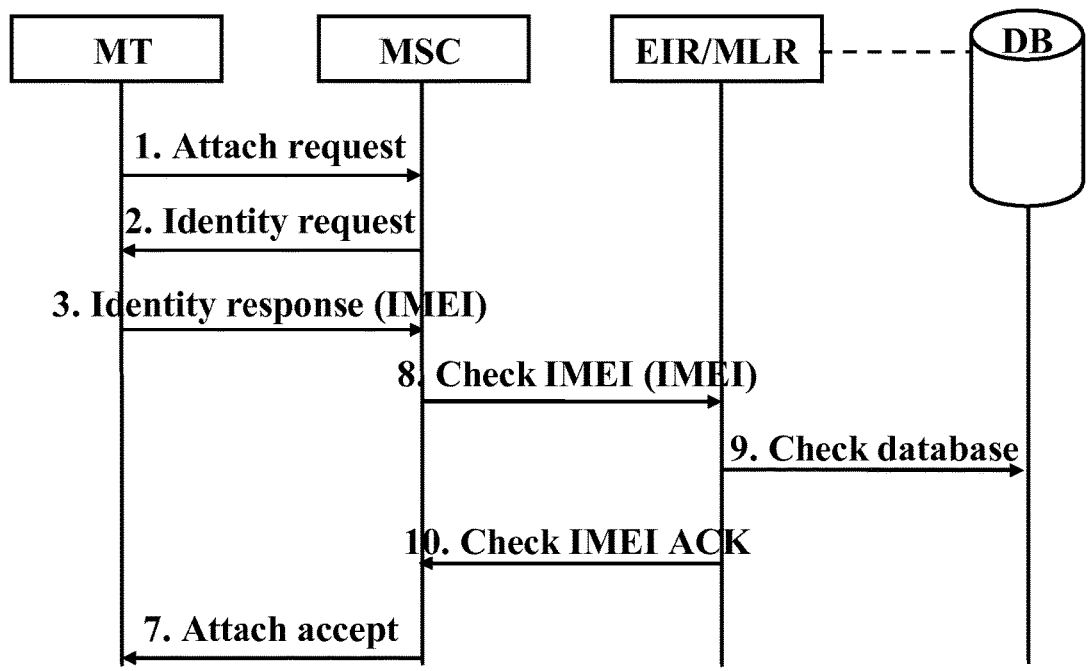

Other features, details and advantages of the invention will emerge more clearly from the detailed description given below by way of indication in relation to drawings in which:

FIG. 1 presents the format of a subscription identifier IMSI,

FIG. 2 presents the format of a terminal identifier IMEI,

FIG. 3 presents the format of an example of a record of the database according to the invention, FIG. 4 presents a flow diagram of the exchanges between modules when a terminal attempts to connect to a cellular network according to a first embodiment of the invention, FIG. 5 presents a flow diagram of the exchanges between modules when a terminal attempts to connect to a cellular network according to a second embodiment of the invention.

A subscription or USIM card is identified uniquely by a subscription identifier or international mobile subscription identity, or IMSI. As illustrated in FIG. 1, such a subscription identifier IMSI typically comprises 14 or 15 digits, also referred to as digital characters. These digits are distributed as illustrated in three first mobile country code (MCC) digits, followed by two (in Europe) or three (in North America) mobile network code (MNC) digits, themselves followed by eight mobile subscription identification number (MSIN) digits uniquely identifying a subscription.

A terminal is identified uniquely by a terminal identifier or international mobile equipment identity (IMEI). As illustrated in FIG. 2, such a terminal identifier IMEI typically comprises 15 or 17 digits. These digits are distributed as illustrated in eight first type allocation code (TAC) digits defining a type of terminal, followed by six other serial number (SN) digits, themselves followed by a last check digit CTL, used as a checksum of the other digits.

The present invention is not limitative of a terminal type. A terminal may be any equipment able to connect to a wireless communication network in order to send and preferably receive messages. Thus, in the context of the present invention, a terminal may be a sensor provided with a transmitter. Such a sensor may for example capture a temperature, a current, a pressure, a light signal, a digital or analogue value, etc. In the context of the present invention, a terminal may also have a user interface such as a mobile telephone, a personal digital assistant (PDA), a digital graphical tablet or a portable personal computer.

The terminal identifier IMEI is unique for a given terminal, in that the serial number SN is unique in a given type TAC. It should be noted that the TAC, which defines a terminal type, is a prefix of the terminal identifier IMEI. By verifying/comparing an IMEI only for the initial prefix part of the TAC, it is possible to include all the terminal identifiers IMEI and therefore all the terminals of this same type TAC. This makes it possible to define an association rule for a single terminal by comparing the entire terminal identifier IMEI, or for a terminal type by comparing only the prefix part of the terminal identifier, that is to say the TAC part of its IMEI. The prefix/TAC is thus used as a mask during a step of verifying the presence of a given terminal identifier in a plurality of terminal identifiers.

The method according to the invention is intended to be used in a cellular communication network environment. It aims to determine whether a terminal MT and a subscription are authorised together to access and use said cellular communication network.

To this end the method comprises the following steps. During a first preparatory phase a step of creating a database DB and where applicable the records 10 that it contains is performed. During a second use phase a verification step and authorisation step are performed.

The database DB can be managed by any cellular communication network module. It may also be distributed over several modules distributed in the cellular communication network.

The creation of a record 10 in the database DB is typically prior to the use phase. Thus, according to one embodiment, there are created, with a database management tool, records 10 defining the terminals, groups of terminals or types of terminals that are authorised to use the cellular communication network and with which subscription, or which groups of subscriptions. However, according to an embodiment described later, the creation of a record 10 may also be concomitant with the use.

A record 10, an embodiment of which is illustrated in FIG. 3, associates a plurality 11 of subscription identifiers comprising at least one subscription identifier 12 with a plurality 15 of terminal identifiers IMEI comprising at least one terminal identifier 16.

During the verification step, the method verifies when a terminal MT attempts to access the services of the cellular communication network with a subscription, which the terminal MT/subscription pair is authorised for such access. To do this, the method runs through the database DB in order to verify the presence of at least one record 10 comprising together the subscription identifier IMSI of said subscription and the terminal identifier IMEI of said terminal MT.

Such verification is advantageously performed at the time of each attempt at connection of a terminal MT or of a subscription to the cellular communication network.

Next the authorisation step takes place. During this step, according to the result of the verification step, the method authorises access or not and permits connection to the cellular communication network. If a record 10 has been found that comprises together the subscription identifier IMSI of the subscription and the terminal identifier IMEI of the terminal MT, candidates for the use of the cellular communication network, the method authorises the connection. The method refuses it in the contrary case.

The creation of a record 10 in the database DB may be done well before the use of the database DB during a proprietary phase. According to an advantageous embodiment, it is possible to create a record 10 automatically in the database DB at the first attempt at connection of a terminal MT and of a subscription. Thus, if a terminal MT or a subscription is not known to the database DB, and no record 10 is yet present in the database DB comprising the terminal identifier IMEI of said terminal or the subscription identifier IMSI of said subscription, such a record 10 may be created at the first attempt at connection of said terminal MT and said subscription. Said record 10 is then created, which comprises a plurality of subscription identifiers comprising at least the subscription identifier IMSI of said subscription associated with a plurality of terminal identifiers comprising at least the terminal identifier IMEI of said terminal MT. This automatic creation may be modified or adapted according to certain configuration parameters of the method, which are detailed later.

The function of a record 10 of the database DB is associating at least one subscription identifier IMSI and at least one terminal identifier IMEI. However, in order to facilitate the definition of the subscription/terminal pairs authorised and the filling of the database DB, without requiring creating a record 10 per subscription/terminal pair, possibilities are provided for grouping together the subscription/terminal pairs within the same record 10. A grouping may be done on the subscription identifiers, on the terminal identifiers or on both at the same time.

In a record 10, a plurality 11 of subscription identifiers comprises at a minimum only a single subscription identifier 12. It may also comprise a list or a set of subscription identifiers 12-14. In this case, during a verification step, a candidate subscription identifier IMSI is compared with all the subscription identifiers 12-14 included in the record 10.

Another advantageous means of including a larger number of subscription identifiers in a record 10 is to use a range. A range is defined by a minimum subscription identifier and a maximum subscription identifier. This amounts to including in the relevant record 10 all the subscription identifiers included between said minimum subscription identifier and said maximum subscription identifier. In this case, during a verification step, a candidate subscription identifier IMSI is compared with the minimum subscription identifier and with the maximum subscription identifier, in order to verify whether or not it belongs to the range. This amounts to comparing it with all the subscription identifiers included in the range, and therefore in the record 10.

Such a subscription identifier range is advantageous in that it typically comprises a continuous series of subscription identifiers as delivered by a supplier during a wholesale purchase. This is typically the case with intermachine environments where many subscriptions are necessary.

The above two means may also be combined. It is thus possible to include in a record 10 a list or a set comprising one or more subscription identifiers and/or one or more subscription identifier ranges.

In this case also, during a verification step, a candidate subscription identifier IMSI is compared with all the subscription identifiers thus included or defined by the record 10.

Likewise, in a record 10, a plurality 15 of terminal identifiers comprises at a minimum a single terminal identifier. It may also comprise a list or a set of terminal identifiers 16-18. In this case, during a verification step, a candidate terminal identifier IMEI is compared with all the terminal identifiers 16-18 included in the record 10.

Another advantageous means of including a larger number of terminal identifiers in a record 10 is, like the subscription identifiers, using a range.

Another advantageous means of including a larger number of terminal identifiers in a record 10 is considering a terminal identifier prefix. The indication of a prefix amounts to indicating the first n digits of a terminal identifier. Such a prefix then defines, like a mask, all the terminal identifiers that have the same prefix, that is to say that have the same first n digits as said prefix. This amounts to including in the relevant record 10 all the terminal identifiers that have the same first n digits as said prefix.

In this case, during a verification step, only the prefix of a candidate identifier IMEI is compared with the definition prefix contained in the record 10, in order to verify that the prefixes correspond and that the candidate terminal identifier IMEI is included in the record 10.

Such a prefix is advantageous in that it makes it possible to define a large number of terminal identifiers. According to a particular embodiment, where the prefix comprises the first n=8 digits, said prefix is merged with the TAC that defines a terminal type. Thus it is advantageously possible to define a record 10 that defines a possible association between a subscription or a plurality of subscriptions and at least one terminal type Thus it is possible to associate a subscription, or set, or range of subscriptions, with one or more terminals, or types of terminal.

The above three means may also be combined. It is thus possible to include in a record 10 a list or a set comprising one or more terminal identifiers and/or one or more ranges of terminal identifier and/or one or more terminal identifiers prefixes.

In this case also, during a verification step, a candidate terminal identifier IMEI is compared with all the terminal identifiers thus included or defined by the record 10.

By combining, it is possible, in the same record 10, to associate a plurality of subscription identifiers comprising zero or several subscription identifiers and zero or several subscription identifier ranges with a plurality of terminal identifiers comprising zero or several terminal identifiers, zero or several terminal identifier ranges and zero or several terminal identifier prefixes, or even zero or several ranges of terminal identifier prefixes.

In order to specify the method of performing the steps of creation and verification or authorisation, it is possible to add configuration parameters to the method. Such parameters may be associated with each record 10 in the database DB, or with the method itself, for example in the form of a default parameter for any new record 10.

Such a parameter may be a "verification mode" 19. This "verification mode" 19 specifies the modalities of the verification step and may take as values "none", "static check" and "dynamic check".

Associated with a record 10, such a "verification mode" 19 determines how the verification step is performed. For a record 10 for which the "verification mode" 19 has the value "none", the subscription identifier IMSI of this subscription is not verified. Thus, if a candidate subscription identifier IMSI is found to be present in a record 10 allocated a "verification mode" positioned at "none", said candidate subscription is authorised to access the cellular communication network without any other form of verification.

In an application dedicated to an intermachine environment, the objective is mainly to verify that subscriptions with a specific tariff, dedicated to machine terminals, are not used in telephones. On the other hand, a conventional telephony subscription can be used in a machine terminal. It may thus be associated, in a record 10 in the database DB, with a "verification mode" positioned at "none". The disadvantageous tariff for such an intermachine application of such a telephony subscription may however dissuade from such a use.

For a record 10, the "static verification" value is the most usual value. In this case, the subscription identifier IMSI of the candidate subscription is verified with the terminal identifier IMEI of the candidate terminal in relation to the records 10 in the database DB. It is thus verified that there exists at least one record 10 in the database DB comprising both the subscription identifier IMSI of the candidate subscription and the terminal identifier IMEI of the candidate terminal, in order to authorise access or not of said terminal/ subscription pair.

For a record 10, the value "dynamic verification" is used for a record 10 in the database (DB) intended to be created/ updated at the first attempt at connection to the cellular communication network. This "dynamic verification" value is temporary in that it is modified as soon as the record 10 is created/updated, in order to take a new value from "none" or "static verification".

Associated with the method, as a default value, such a "verification mode" determines the value taken by the "verification mode" of a newly created record 10.

Thus it may be decided that, for any new terminal/ subscription pair that has never been "seen" by the method, and for which no record 10 exists in the database DB, a new record 10 is created which by default takes a "verification mode" value equal for example to "dynamic verification".

Another parameter may be a "value mode" 20. This "value mode" 20 specifies the modalities of the verification step and may take "IMEI" or "TAC" as values.

Associated with a record 10, such a "value mode" 20 determines how the candidate terminal identifier IMEI is compared with the terminal identifiers 16-18 of the plurality 15 of terminal identifiers of the record. If the value is "IMEI", a candidate terminal identifier IMEI is verified exactly, that is to say it is verified that the entire terminal identifier is present in the plurality 15. On the other hand, if the value is "TAC", a candidate terminal identifier IMEI is verified for a limited part to its prefixed TAC, that is to say it is verified that at least the prefix of the terminal identifier is present in the plurality 15.

Associated with the method, as default value, such a "value mode" determines the way of creating a new record 10. At the time of an automatic creation of a new record 10, this record 10 is allocated at least one subscription identifier equal to the candidate subscription identifier IMSI. It is also allocated at least one terminal identifier. This terminal identifier thus populates the plurality 15 of terminal identifiers. The entire terminal identifier IMEI is added if the default "value mode" is "IMEI". The prefix of the terminal identifier, that is to say the terminal identifier reduced to its TAC, is added if the default "value mode" is "TAC".

Concerning the implementation more particularly of the verification and authorisation steps, the method according to the invention advantageously proceeds by interception of the signalling messages. Thus the method is advantageously implemented at a module, with the essential passage of these signalling messages, when an attempt is made at connecting a terminal MT to the cellular communication network.

Several cellular communication network modules may thus be candidates for performing such interception of the signalling messages. The description that follows is given with reference to a cellular communication network of the GSM type. It can however be extended to any type of network.

A module responsible among other things for locating a terminal MT, advantageous in that it is necessarily contacted at each change of location of a terminal MT, including at each new connection to the network, is a home location register or HLR module.

Another candidate, responsible for blocking a stolen terminal MT, advantageous in that it is necessarily contacted at each new connection to the network, is an equipment identity register (EIR) module.

With reference to FIGS. 4 and 5, there are respectively presented an embodiment based on a location register HLR and an embodiment based on an equipment identity register EIR by means of flow diagrams of the messages exchanged between modules in a cellular communication network. The various modules are, from left to right, a terminal MT, a mobile switching centre (MSC) module and a home location register module HLR with regard to FIG. 4 and an equipment identity register module EIR with regard to FIG. 5. All the messages shown in the diagrams in FIGS. 4 and 5 are signalling messages. In a GSM network, using for example SS7, they use typically the mobile application part (MAP) protocol. Only messages important for understanding have been shown in these two FIGS. 4, 5. Other messages, which are optional or non-essential to understanding, have been omitted. Likewise, according to the configuration of the network, other intermediate modules may appear, such as VLR, the acronym for "visited location register", which relay the messages. These "secondary" messages and modules have intentionally been omitted for reasons of simplification. The present invention naturally extends to the methods including these additional messages and modules.

With reference to the diagram in FIG. 4, when a terminal MT attempts to connect to a cellular communication network, it dialogues wirelessly with a base station or BS. In this base station BS the terminal MT comes more particularly in contact with a mobile switching centre module MSC. The terminal MT sends an attach request 1 to the mobile switching centre MSC. In this request, the subscription identifier IMSI of the subscription used is typically included. This subscription identifier IMSI is conventionally used as an identifier in the cellular communication network and is usually transmitted with a signalling message.

On the other hand, the terminal identifier IMEI is not necessarily known to the network. Thus, according to the invention, if the terminal identifier IMEI is not known, the mobile switching centre MSC proceeds with an identity request 2, by means of a message 2, sent to the terminal MT. The latter responds to the mobile switching centre MSC with an identity response message 3, along with said terminal identifier IMEI.

For any new terminal MT connecting, the mobile switching centre MSC informs a location register module HLR responsible for taking stock of the position of the terminal MT. This is done typically by means of a location update message 4, intended for said location register HLR. This message is conventionally accompanied by the subscription identifier IMSI. According to the invention, the method adds thereto the terminal identifier IMEI. Alternatively, according to the invention, the terminal identifier IMEI may be communicated to the location register HLR by any other communication means.

The location register HLR is thus in possession of the two identifiers, the subscription identifier IMSI and the terminal identifier IMEI. The location register HLR is thus in a position to implement the various steps of the method. In relation to a database DB of which it may or may not be the manager and which may or may not be distant from the HLR, the location register HLR can create a new record 10, or can check whether there exists at least one record 10 in the database DB, which comprises together the subscription identifier IMSI and the terminal identifier IMEI. This is done during a check database step 5.

At the end of such a check, the authorisation step may be proceeded with, depending on the result of the check. If the check is positive, the location register module HLR, according to the invention, returns a location update acknowledgement message 6 to the mobile switching centre module MSC. If the check if negative, the location register module HLR does not return the acknowledgement message 6. It may or may not send an error message to the terminal MT, or inform another module in the network of this erroneous connection attempt.

On reception, where applicable, of the location update acknowledgement message 6, the mobile switching centre MSC, subject to any other conditions prior to a connection being validated, informs the terminal MT that the connection is authorised by an attack accept message 7.

With reference to the diagram in FIG. 5, when a terminal MT attempts to connect to a cellular communication network, the first three steps are the same as for the example in FIG. 4.

For any new terminal MT connecting, the mobile switching centre MSC informs an equipment identity register module EIR responsible for listing the terminals that are prohibited, for example because they have been declared stolen. This module thus has a list of terminal identifiers IMEI and each new terminal that connects to the network must be checked.

For this purpose the mobile switching centre MSC sends to the equipment identity register module EIR a message 8 checking the terminal identifier IMEI, "check IMEI", along with said terminal identifier IMEI in order to check that said terminal is not prohibited.

This message may be accompanied by the subscription identifier IMSI. Failing this, according to the invention, the method adds thereto the subscription identifier IMSI.

According to one embodiment, a missing identifier among the subscription identifier IMSI or the terminal identifier IMEI may be obtained by a direct interrogation command. Such a command according to a remote file management (RFM) protocol, may for example be a "provide local information" command, sent to a cellular communication network module able to respond thereto, such as a location register HLR, or a short message service centre (SMSC) module, or directly the USIM card.

The location register EIR is thus in possession of the two identifiers, the subscription identifier IMSI and the terminal identifier IMEI. The location register EIR is thus in a position to implement the various steps of the method. In relation to a database DB of which it may or may not be the manager and which may or may not be distant from the EIR, the location register EIR can create a new record 10, or can check whether there exists at least one record 10 in the database DB, which comprises together the subscription identifier IMSI and the terminal identifier IMEI. This is done during a check database step 9.

At the end of such a check, the authorisation step may be proceeded with, depending on the result of the check. If the check is positive, the location register module EIR, according to the invention, returns a location update acknowledgement message 10 to the mobile switching centre module MSC. If the check if negative, the location register module ER does not return the acknowledgement message 10. It may or may not send an error message to the terminal MT, or inform another module in the network of this erroneous connection attempt.

On reception, where applicable, of the location update acknowledgement message 10, the mobile switching centre MSC, subject to any other conditions prior to a connection being validated, informs the terminal MT that the connection is authorised by an attach accept message 7.

According to an advantageous embodiment, the method according to the invention is applied to an intermachine environment. In such an environment, the terminals are machines, or machine terminals, and the cellular communication network is used to transmit data between these machines.

In such an environment it is advantageous to manage said machine terminals by means of a particular MLR module. A precise description of such an MLR module is for example given in the European patent application N° 11306123.8 filed on 9 Sep. 2011 by the same applicant.

Such a module MLR is substituted, for the machine terminals and management thereof, for certain modules in the cellular communication network. Among these modules are the location register module HLR and the equipment identity register EIR. Thus, in such an environment comprising an MLR module, this MLR module advantageously implements the method according to the invention. For this purpose said MLR module intercepts the check messages in order to implement the verification and authorisation steps. These check messages necessarily pass through the MLR module since the latter is substituted, at least with regard to the machine terminals, for the location register module HLR and/or the equipment identity register module EIR. The flow diagrams of the exchanges are also shown by FIGS. 4 and 5.

The invention is not limited to the embodiments described above but extends to any embodiment in accordance with the spirit thereof.

The invention claimed is:

1. A method of controlling access to a cellular communication network, for a terminal (MT) identified by a terminal identifier (IMEI) with a respective subscription identified by a subscription identifier (IMSI), the cellular communication network comprising at least one cellular network communication module, at least one database (DB) recorded in data storage means and at least one switching center module (MSC) through which the terminal (MT) is intended to access the cellular communication network, the method comprising the following steps performed by means of at least one processor:

creation of at least one record, in the at least one database (DB) being recorded in data storage means, wherein the step of creating the record in the database (DB) is automatically done at the time of a first attempt at connection of the terminal (MT) and of the respective subscription, the record thus created comprising a plurality of subscription identifiers comprising at least one subscription identifier (IMSI) of said subscription associated with a plurality of terminal identifiers comprising at least one terminal identifier (IMEI) of said terminal (MT), the plurality of terminal identifiers of the record being formed by at least one of one or more terminal identifiers, one or more terminal identifier ranges, and one or more terminal identifier prefixes (TAC), each prefix being deemed to comprise all the terminal identifiers beginning with said prefix (TAC), when the terminal (MT) attempts to access the cellular communication network:

the at least one cellular network communication module receives at least the terminal identifier (IMEI) and the subscription identifier (IMSI) of the terminal (MT),
the at least one cellular network communication module checks that said terminal (MT) together with said respective subscription are authorized to use the cellular communication network, a verification step including:
verifying the presence in the database (DB) of at least one record comprising the subscription identifier (IMSI) of said subscription associated with the terminal identifier (IMEI) of said terminal (MT),
indicating a modality of the verification step through a "value mode" included in the record that indicates how the presence of the terminal identifier (IMEI) of said terminal (MT) is to be verified among the terminal identifiers of the plurality of terminal identifiers of the record, wherein the "value mode" indicates a first modality wherein the terminal identifier (IMEI) of said terminal (MT) must be verified exactly, or the "value mode" indicates a second modality wherein the terminal identifier (IMEI) of said terminal (MT) must be verified by a limited part thereof said verification being performed at the time of each attempt at connection of said terminal (MT) or of said respective subscription to the cellular communication network, and
at least one of authorization of access and refusal of access of said terminal (MT) to said network according to the result of the verification step:
if the at least one record comprising the subscription identifier (IMSI) and the terminal identifier (IMEI) of said terminal (MT) according to the "value mode" are present in the database (DB), then the at least one cellular network communication module sends to the at least one switching center module (MSC) an acknowledgment message, and in response the at least one switching center module (MSC) authorizes the terminal (MT) to access the cellular communication network and;
if either the at least one record comprising the subscription identifier (IMSI) or the terminal identifier (IMEI) of said terminal (MT) according to the "value mode" are not present in the database (DB), then the at least one cellular network communication module does not send to the at least one switching center module (MSC) an acknowledgment message, and in response refuses the terminal (MT) access to the cellular communication network through the at least one switching center module (MSC).

2. The method according to claim 1, where a plurality of subscription identifiers is defined by at least one range defined by a minimum subscription identifier and a maximum subscription identifier, and is deemed to comprise all the subscription identifiers included between said minimum subscription identifier and said maximum subscription identifier.

3. The method according to claim 1, where a record in the database (DB) also comprises a "verification mode" taking its values from: "none" for which the subscription identifier (IMSI) of the subscription is not verified, "static verification" for which the subscription identifier (IMSI) of the subscription is verified in relation to the terminal identifier (IMEI) and the records in the database, and "dynamic verification" for which a record in the database (DB) is created/updated, the "verification mode" of said record being, after creation, changed from "dynamic verification" to another value.

4. The method according to claim 1, where the record in the database (DB) relating to the "value mode" takes its values from: "IMEI" for which a terminal identifier (IMEI) is verified exactly, and "TAC" for which a terminal identifier (IMEI) is verified for a limited part to its prefix (TAC).

5. The method according to claim 1, where the "value mode" determines the manner of creating a new record at the time of an automatic creation of the new record done at a first connection attempt of a terminal (MT), the record being allocated at least one subscription identifier equal to the subscription identifier (IMSI) of said associated subscription and also being allocated at least one terminal identifier populating said plurality of terminal identifiers and corresponding, according to the value of the "value mode": either to the entire terminal identifier (IMEI) of said terminal (MT) or to a prefix (TAC) of the terminal identifier of said terminal (MT).

6. The method according to claim 1, where the verification and authorization steps are implemented by interception of the check messages, necessarily passing through a module, when a terminal (MT) attempts to connect to the cellular communication network.

7. The method according to claim 6, where said module is a location register module (HLR).

8. The method according to claim 6, where said module is an equipment identity register module (EIR).

9. The method according to claim 1, in which the terminal (MT) is a sensor dedicated to a machine for transferring information captured by the sensor to a server connected to said network.

10. The method according to claim 1, applied to an intermachine environment dedicated to machine terminals, where the verification and authorization steps are implemented by intercepting the check messages, necessarily passing through a module (MLR) substituted, with regard to said machine terminals, for a location register module (HLR) and/or an equipment identity register module (EIR).

11. A non-transitory computer program product comprising instructions which, when they are implemented by at least one processor, execute at least the following steps of the method according to claim 1:
verification that said terminal (MT) together with said subscription are indeed authorised to access the cellular communication network, by verifying the presence in a database (DB) of at least one record comprising the subscription identifier (IMSI) of said subscription associated with the terminal identifier (IMEI) of said terminal (MT) or associated with an identifier prefix (TAC) of said terminal (MT); said verification being made according to the "value mode" and said verification being performed at each attempt at connection of said terminal (MT) or said subscription to the cellular communication network,
at least one of authorization of access and refusal of access of said terminal (MT) to said network according to the result of the verification step.

12. A system for controlling access to a cellular communication network, for a terminal (MT) identified by a terminal identifier (IMEI) with a subscription identified by a subscription identifier (IMSI), wherein the system comprises:
at least one cellular network communication module, at least one switching center module (MSC) through which the terminal (MT) is intended to access the cellular communication network, data storage means comprising at least one database (DB), the database (DB) comprising at least one record associating a plurality of subscription identifiers comprising at least one subscription identifier with a plurality of terminal identifiers comprising at least one terminal identifier, the plurality of terminal identifiers of the record being formed by at least one of one or more terminal identifiers, one or more ranges of terminal identifiers, and one or more terminal identifier prefixes (TAC), each prefix being deemed to comprise all the terminal identifiers beginning with said prefix (TAC), wherein when the terminal (MT) attempts to access the cellular communication network, the at least one cellular network communication module is configured to:

receive at least the terminal identifier (IMEI) and the subscription identifier (IMSI) of the terminal (MT), verify, at each attempt at connection of said terminal (MT) or said subscription to the cellular communication network, that said terminal (MT), together with said subscription, are authorized to use the cellular communication network, by verifying the presence in the database (DB) of at least one record comprising the subscription identifier (IMSI) of said subscription associated with the terminal identifier (IMEI) of said terminal (MT), the record also comprising a "value mode" that determines how the presence of the terminal identifier (IMEI) of said terminal (MT) is to be verified among the terminal identifiers in the plurality of terminal identifiers of the record, the "value mode" indicating a first modality wherein the terminal identifier (IMEI) of said terminal (MT) must be verified exactly, or the "value mode" indicating a second modality wherein the terminal identifier (IMEI) of said terminal (MT) must be verified by a limited part thereof, and wherein the system is configured so that:
if the result of the verification is positive, then the at least one cellular network communication module sends to the at least one switching center module (MSC) an acknowledgment message, and in response the at least one switching center module (MSC) enables the terminal (MT) to access the cellular communication network and;

if the result of the verification is negative such that at least one of the subscription identifier (IMSI) and the terminal identifier (IMEI) is not present, then the at least one cellular network communication module does not send to the at least one switching center module (MSC) an acknowledgment message and prevents thereby that the terminal (MT) accesses the cellular communication network through the at least one switching center module (MSC).

13. The system according to claim 12, in which data storage means, are included in said cellular network communication module.

14. The method according to claim 1, wherein a SIM card inserted in the terminal (MT) stores the subscription identifier (IMSI) and wherein if the result of the check is negative, then the SIM card is not altered.

15. The method according to claim 1, wherein the at least one cellular network communication module is different from the at least one switching center module (MSC).

16. A method of controlling access to a cellular communication network, for a terminal (MT) identified by a terminal identifier (IMEI) with a subscription identified by a subscription identifier (IMSI), the cellular communication network comprising at least one cellular network communication module, at least one database (DB) recorded in data storage means and at least one switching center module (MSC) through which the terminal (MT) is intended to access the cellular communication network, the method comprising the following steps performed by means of at least one processor:

creation, in the at least one database (DB) being recorded in data storage means of at least one record associating a plurality of subscription identifiers comprising at least one subscription identifier with a plurality of terminal identifiers comprising at least one terminal identifier, the plurality of terminal identifiers of the record being formed by at least one of one or more terminal identifiers, one or more terminal identifier ranges, and one or more terminal identifier prefixes (TAC), each prefix comprising all the terminal identifiers beginning with said prefix (TAC), when the terminal (MT) attempts to access the cellular communication network:

receiving at least the terminal identifier (IMEI) and the subscription identifier (IMSI) of the terminal (MT) at the at least one cellular network communication module, checking that said terminal (MT) together with said subscription are authorized to use the cellular communication network, by verifying the presence in the database (DB) of at least one record comprising the subscription identifier (IMSI) of said subscription associated with the terminal identifier (IMEI) of said terminal (MT), said verification being performed at the time of each attempt at connection of said terminal (MT) or of said subscription to the cellular communication network, checking for at least one missing identifier among the plurality of subscription identifiers (IMSI) and the plurality of terminal identifiers (IMEI), and at least one of authorization of access and refusal of access of said terminal (MT) to said network according to the result of the check:

if the result of the check is positive, then the at least one cellular network communication module sends to the at least one switching center module (MSC) an acknowledgment message, and in response the at least one switching center module (MSC) authorizing the terminal (MT) to access the cellular communication network and;

if the result of the check is negative, then the at least one cellular network communication module does not send to the at least one switching center module (MSC) an acknowledgment message, and thereby refusing the terminal (MT) access to the cellular communication network through the at least one switching center module (MSC).

17. The system of claim 12, wherein the cellular network communication module is further configured to check for at least one missing identifier among the plurality of subscription identifiers (IMSI) and the plurality of terminal identifiers (IMEI); and wherein in response to detection of the at least one missing identifier the cellular network communication module obtains the at least one missing identifier by a direct interrogation command.

18. The system of claim 17, wherein the direct interrogation command is delivered according to a remote file management (RFM) protocol;

wherein the direct interrogation command is delivered to the cellular network communication module able to respond thereto; and wherein the respective cellular network communication module comprises at least one of a location register (HLR), a short message service center (SMSC) module, and a SIM card.

* * * * *